United States Patent
Carson et al.

(10) Patent No.: US 12,508,539 B2
(45) Date of Patent: Dec. 30, 2025

(54) SYSTEMS AND METHODS OF RENEWABLE NATURAL GAS PROCESSING

(71) Applicant: Alchemy CO2, PBC, Atlanta, GA (US)

(72) Inventors: Christopher S. Carson, Bussum (NL); Noah A. Leinwand, New York, NY (US); Casey J. Leist, Atlanta, GA (US)

(73) Assignee: Alchemy CO2, PBC, Atlanta, GA (US)

( * ) Notice: Subject to any disclaimer, the term of this patent is extended or adjusted under 35 U.S.C. 154(b) by 0 days.

(21) Appl. No.: 19/230,945

(22) Filed: Jun. 6, 2025

(65) Prior Publication Data
US 2025/0303355 A1  Oct. 2, 2025

Related U.S. Application Data

(63) Continuation of application No. 19/228,271, filed on Jun. 4, 2025, which is a continuation of application No. PCT/US2024/033079, filed on Jun. 7, 2024.
(Continued)

(51) Int. Cl.
*B01D 53/02* (2006.01)
*B01D 53/04* (2006.01)
(Continued)

(52) U.S. Cl.
CPC ....... *B01D 53/229* (2013.01); *B01D 53/0462* (2013.01); *B01D 53/047* (2013.01);
(Continued)

(58) Field of Classification Search
CPC .... B01D 53/226; B01D 53/002; B01D 53/04; B01D 53/229; B01D 2256/22;
(Continued)

(56) References Cited

U.S. PATENT DOCUMENTS

| | | |
|---|---|---|
| 4,374,657 A | 2/1983 | Schendel et al. |
| 4,602,477 A | 7/1986 | Lucadamo |

(Continued)

FOREIGN PATENT DOCUMENTS

| | | |
|---|---|---|
| CN | 107758664 A | 3/2018 |
| WO | 2022055125 A1 | 3/2022 |

(Continued)

OTHER PUBLICATIONS

"International Application Serial No. PCT/US2024/033071, International Search Report and Written Opinion mailed Nov. 27, 2024", Alchemy CO2, PBC, 34 pages.
(Continued)

*Primary Examiner* — Christopher P Jones
(74) *Attorney, Agent, or Firm* — GTC Law Group PC & Affiliates

(57) ABSTRACT

Example gas recovery systems disclosed herein include a source gas conditioning assembly comprising a compression component and swing adsorption component configured to provide a conditioned source gas, a first membrane assembly to separate the conditioned source gas into a hydrocarbon enriched stream and a recovery stream, a second membrane assembly to separate the hydrocarbon enriched stream into a hydrocarbon product stream and a recycle stream, a carbon dioxide plant assembly to provide a carbon dioxide product stream and an enriched recycle stream, and a standalone membrane assembly at least selectively fluidly coupled to the enriched recycle stream, and separates the enriched recycle stream into a hydrocarbon enriched recycle stream and an effluent stream. The swing adsorption component is at least selectively coupled to the enriched recycle stream. The source gas conditioning assembly is fluidly coupled to the recycle stream, and at least selectively coupled to the hydrocarbon enriched recycle stream.

18 Claims, 9 Drawing Sheets

Related U.S. Application Data

(60) Provisional application No. 63/548,011, filed on Nov. 10, 2023, provisional application No. 63/471,630, filed on Jun. 7, 2023, provisional application No. 63/471,626, filed on Jun. 7, 2023, provisional application No. 63/471,628, filed on Jun. 7, 2023, provisional application No. 63/471,624, filed on Jun. 7, 2023, provisional application No. 63/471,625, filed on Jun. 7, 2023.

(51) Int. Cl.
  *B01D 53/047* (2006.01)
  *B01D 53/22* (2006.01)
  *B01D 53/26* (2006.01)
  *C10L 3/10* (2006.01)

(52) U.S. Cl.
  CPC ............ *B01D 53/226* (2013.01); *B01D 53/26* (2013.01); *C10L 3/10* (2013.01); *B01D 2253/102* (2013.01); *B01D 2256/22* (2013.01); *B01D 2256/24* (2013.01); *B01D 2257/304* (2013.01); *B01D 2257/708* (2013.01); *B01D 2257/80* (2013.01)

(58) Field of Classification Search
  CPC .......... B01D 2256/24; B01D 2256/245; B01D 2257/504; B01D 2258/05; B01D 2311/14; C10L 3/101; C10L 2290/10; C10L 2290/548; F25J 3/0209; F25J 3/0266; F25J 2210/66; Y02C 20/40
  See application file for complete search history.

(56) References Cited

U.S. PATENT DOCUMENTS

| | | | |
|---|---|---|---|
| 4,639,257 | A | 1/1987 | Duckett et al. |
| 4,659,343 | A | 4/1987 | Kelly |
| 4,701,187 | A | 10/1987 | Choe et al. |
| 4,772,295 | A | 9/1988 | Shibuya et al. |
| 4,936,887 | A | 6/1990 | Waldo et al. |
| 5,089,034 | A | 2/1992 | Markovs et al. |
| 5,727,903 | A | 3/1998 | Borray et al. |
| 6,128,919 | A | 10/2000 | Daus et al. |
| 6,572,679 | B2 | 6/2003 | Baker et al. |
| 6,610,124 | B1 | 8/2003 | Dolan et al. |
| 6,630,011 | B1 | 10/2003 | Baker et al. |
| 8,999,038 | B2 | 4/2015 | Ungerank et al. |
| 9,180,402 | B2 * | 11/2015 | Buse .................. B01D 53/1462 |
| 11,980,846 | B1 | 5/2024 | Bikson |
| 12,139,681 | B1 | 11/2024 | Bikson |
| 12,139,682 | B1 | 11/2024 | Bikson |
| 2004/0018144 | A1 | 1/2004 | Briscoe |
| 2004/0099138 | A1 | 5/2004 | Karode et al. |
| 2004/0103782 | A1 | 6/2004 | Wascheck et al. |
| 2007/0166205 | A1 | 7/2007 | Holst et al. |
| 2007/0243127 | A1 | 10/2007 | Fedorov et al. |
| 2009/0165377 | A1 | 7/2009 | Koh et al. |
| 2010/0236404 | A1 * | 9/2010 | Baker .................. B01D 53/22 95/51 |
| 2010/0256245 | A1 | 10/2010 | Iaccino et al. |
| 2011/0094378 | A1 | 4/2011 | Mitariten |
| 2012/0121497 | A1 | 5/2012 | Terrien et al. |
| 2012/0180389 | A1 | 7/2012 | Knaebel |
| 2012/0291483 | A1 | 11/2012 | Terrien et al. |
| 2012/0292574 | A1 | 11/2012 | Terrien et al. |
| 2013/0131199 | A1 | 5/2013 | Lien et al. |
| 2013/0142720 | A1 | 6/2013 | Chen et al. |
| 2014/0090556 | A1 * | 4/2014 | Shah .................. B01D 53/185 96/9 |
| 2015/0122122 | A1 | 5/2015 | W Mustapa et al. |
| 2015/0323248 | A1 | 11/2015 | Terrien et al. |
| 2015/0360165 | A1 | 12/2015 | Carson et al. |
| 2016/0001219 | A1 | 1/2016 | Ho et al. |
| 2017/0283292 | A1 | 10/2017 | Kim |
| 2018/0133643 | A1 | 5/2018 | Ho et al. |
| 2018/0223205 | A1 * | 8/2018 | Mitariten ................ C10L 3/104 |
| 2018/0250627 | A1 | 9/2018 | Zick et al. |
| 2019/0030482 | A1 | 1/2019 | Ding et al. |
| 2019/0060835 | A1 | 2/2019 | Ding et al. |
| 2020/0203738 | A1 | 6/2020 | Jolly et al. |
| 2020/0307997 | A1 | 10/2020 | Tranier |
| 2021/0339189 | A1 * | 11/2021 | Winkler ............ B01D 53/0423 |
| 2022/0041442 | A1 * | 2/2022 | Coleman ................ C01B 3/501 |
| 2023/0119784 | A1 | 4/2023 | Reinertsen et al. |
| 2023/0132426 | A1 * | 5/2023 | Kim ........................ C01B 3/503 95/55 |
| 2024/0019205 | A1 | 1/2024 | Prince |
| 2025/0035376 | A1 | 1/2025 | Valentin et al. |
| 2025/0066272 | A1 | 2/2025 | O'brien et al. |
| 2025/0177908 | A1 | 6/2025 | Carson et al. |
| 2025/0177909 | A1 | 6/2025 | Carson et al. |
| 2025/0177910 | A1 | 6/2025 | Carson et al. |

FOREIGN PATENT DOCUMENTS

| | | |
|---|---|---|
| WO | 2024254496 A2 | 12/2024 |
| WO | 2024254503 A2 | 12/2024 |
| WO | 2024254510 A2 | 12/2024 |
| WO | 2024254496 A3 | 4/2025 |
| WO | 2024254503 A3 | 4/2025 |
| WO | 2024254510 A3 | 4/2025 |

OTHER PUBLICATIONS

"International Application Serial No. PCT/US2024/033071, Invitation to Pay Additional Fees and, Where Applicable, Protest Fee mailed Sep. 12, 2024", Alchemy CO2, PBC, 3 pages.

"International Application Serial No. PCT/US2024/033079, International Search Report and Written Opinion mailed Nov. 5, 2024", Alchemy CO2, PBC, 19 pages.

"International Application Serial No. PCT/US2024/033079, Invitation to Pay Additional Fees And, Where Applicable, Protest Fee mailed Sep. 10, 2024", Alchemy CO2, PBC, 3 pages.

"International Application Serial No. PCT/US2024/033087, International Search Report and Written Opinion mailed Nov. 27, 2024", Alchemy CO2, PBC, 25 pages.

"International Application Serial No. PCT/US2024/033087, Invitation to Pay Additional Fees and, Where Applicable, Protest Fee mailed Sep. 10, 2024", Alchemy CO2, PBC, 3 pages.

* cited by examiner

SYSTEMS AND METHODS OF RENEWABLE NATURAL GAS PROCESSING

CLAIM TO PRIORITY

This application is a continuation of U.S. application Ser. No. 19/228,271, filed on Jun. 4, 2025, which is incorporated by reference herein for all purposes.

U.S. application Ser. No. 19/228,271 is a continuation of PCT International Patent Application Serial Number PCT/US2024/033079, filed on Jun. 7, 2024, published as WO 2024/254503 incorporated by reference for all purposes, and claims priority to U.S. Application Ser. No. 63/471,624 filed Jun. 7, 2023, 63/471,625 filed Jun. 7, 2023, 63/471,626 filed Jun. 7, 2023, 63/471,628 filed Jun. 7, 2023, 63/471,630 filed Jun. 7, 2023, and 63/548,011 filed Nov. 10, 2023.

BACKGROUND

Presently known gas recovery systems suffer from a number of challenges. For example, recovery gas streams, such as landfill gas, have a number of constituents that are not primary natural gas constituents (e.g., methane). Accordingly, those constituents lead to excessive energy utilization to maintain high recycle rates, a significant portion of pumping energy committed to recycling non-valuable gas constituents, loss of hydrocarbon product gas to purge streams, or the like.

SUMMARY

Example embodiments of the present disclosure provide for systems capable to perform essentially 100% recovery of a primary product (e.g., natural gas or methane) and a secondary product (e.g., $CO_2$), from a gas source such as landfill gas and/or a biogas. Example embodiments of the present disclosure provide for gas compression costs and recycle rates for a membrane based gas recovery system. Example embodiments of the present disclosure utilize residual pressure from a $CO_2$ plant to operate a standalone membrane, and/or drive recycle gas for the gas recovery system. Example embodiments of the present disclosure integrate secondary recovery of a primary product, for example from a standalone membrane, for recycling to a gas source (e.g., a hydrocarbon enriched stream) and/or to a $CO_2$ plant (e.g., a $CO_2$ enriched stream). Example embodiments of the present disclosure provide for a zero emission system.

Example embodiments of the present disclosure include a swing adsorption component in a gas conditioning assembly of a gas recovery system, for example to remove volatile organic compounds from the source gas. Example embodiments of the present disclosure include utilization of one or more of various streams to support flush/regeneration operations of the swing adsorption component, including potentially a permeate stream from one or more membrane assemblies in the gas recovery system, and/or a non-condensable stream from a $CO_2$ plant. Example embodiments including selectively utilizing these, for example providing a membrane permeate as a flush gas when needed, and recovering gases from the membrane permeate (e.g., by providing to a $CO_2$ plant) when the flush gas is not needed, and/or according to operating parameters such as the present composition of the membrane permeate, the availability and/or cost of available alternate flush gases, or the like. Example embodiments of the present disclosure include an available alternate flush gas, which may be utilized during operating periods where other flush streams are not available, not sufficient, or more valuable to utilize for further recovery or other operations within the gas recovery system. Such example embodiments can reduce or eliminate the reliance on alternate or dedicated flush gas, which may be expensive, require additional equipment and facility space to implement alternate flush gas regeneration and/or to store and provide the alternate flush gas.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1:
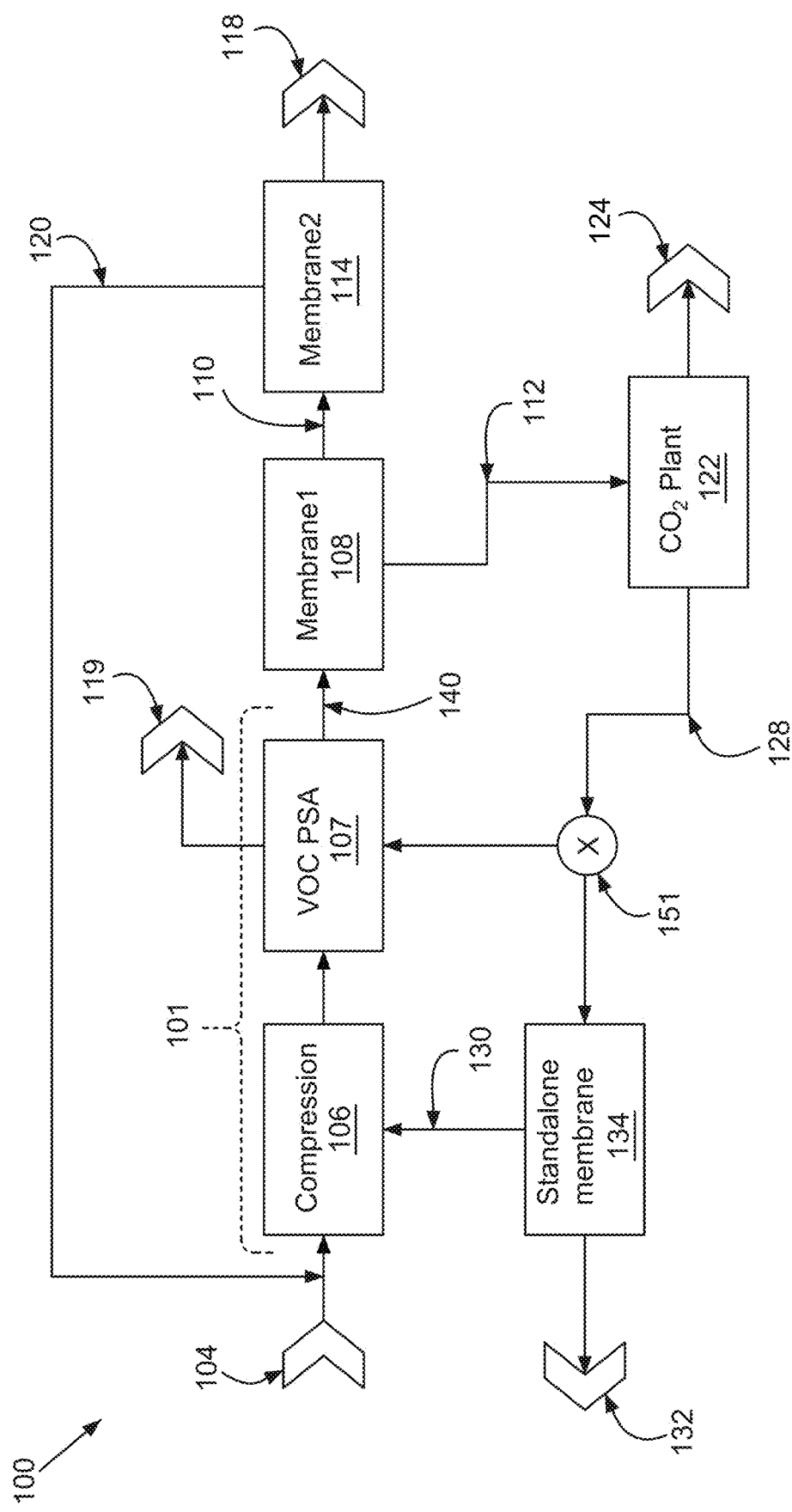
FIG. 1 depicts an example gas recovery system.

Before the present disclosure is described in further detail, it is to be understood that the disclosure is not limited to the particular embodiments described. It is also understood that the terminology used herein is for the purpose of describing particular embodiments only, and is not intended to be limiting. The scope of the present disclosure will be limited only by the claims. As used herein, the singular forms "a", "an", and "the" include plural embodiments unless the context clearly dictates otherwise.

In this application, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" and "approximately" are used as equivalents and may be understood to permit standard variation as would be understood by those of ordinary skill in the art; and (v) where ranges are provided, endpoints are included.

Composition: as used herein, may be used to refer to a discrete physical entity that comprises one or more specified components. In general, unless otherwise specified, a composition may be of any form—e.g., gas, gel, liquid, solid, etc. In some embodiments, "composition" may refer to a combination of two or more entities for use in a single embodiment or as part of the same article. It is not required in all embodiments that the combination of entities result in physical admixture, that is, combination as separate co-entities of each of the components of the composition is possible; however many practitioners in the field may find it advantageous to prepare a composition that is an admixture of two or more of the ingredients in a pharmaceutically acceptable carrier, diluent, or excipient, making it possible to administer the component ingredients of the combination at the same time.

Improve, increase, or reduce: as used herein or grammatical equivalents thereof, indicate values that are relative to a baseline measurement, such as a measurement in a similar composition made according to previously known methods.

It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

Embodiments herein provide for systems, procedures, and/or apparatuses for providing recovered process streams for renewable natural gas recovery and/or upgrading. Aspects of the present disclosure reference "natural gas" for clarity of the description. The term "natural gas" should be understood broadly, and includes renewable natural gas, landfill gas, fossil fuel natural gas, gas from biodigesters, and the like. Example recovered process streams include, without limitation, improved natural gas recovery (e.g., volume, composition, and/or recovery cost), secondary natural gas recovery, and/or carbon dioxide product recovery. In certain embodiments, example systems, procedures, and/or apparatuses for renewable natural gas recovery are applicable to any type of natural gas stream, and/or gas stream including typical natural gas constituents (e.g., low carbon count hydrocarbons, such as methane, ethane, propane, butane, etc.) as a major portion thereof, including for example processing of landfill gases, or any other type of gases, such as biogas, coming from certain food waste streams, farm product streams, manure sources, waste treatment plants, wineries, and/or any facility having organic waste associated therewith. Example and non-limiting product streams for embodiments herein include, without limitation, one or more of a primary natural gas stream, a secondary natural gas stream, and/or a carbon dioxide stream. In certain embodiments, a product stream, as utilized herein, may be provided as an explicit product stream (e.g., provided to an external system, such as a natural gas pipeline, etc.), utilized internally (e.g., in a burner, as a constituent supply stream, for in-situ electricity generation, etc.), stored for later delivery and/or utilization, etc. The description herein referencing a product stream should be understood broadly, where a product stream includes any stream that has been processed herein and is ready for utilization or further processing for a purpose. Throughout this disclosure, the terms carbon dioxide and $CO_2$ are used interchangeably.

The description herein referencing certain streams as a permeate stream and/or a retentate stream are non-limiting examples for clarity of the present description. The number and arrangement of membranes, streams, and the like, is dependent upon the constituents of various streams, the characteristics of the membranes utilized (e.g., selectivity, permeability to various constituents being separated, operating pressures, etc.), system pressures, temperatures, and/or flow rates, or the like. The description herein referencing certain streams as product streams, permeate streams, retentate streams, intermediate streams, recycle streams, recovery streams, or the like, are non-limiting examples provided for clarity of the present description. Arrangements depicted herein, including arrangements described herein and/or consistent with descriptions herein, are non-limiting examples, and can be adjusted as described herein and/or as understood to one of skill in the art having the benefit of the present disclosure, and further such arrangements are not limited to naming conventions utilized herein.

Gas separation and purification processes may be used to maximize the value of carbon dioxide ($CO_2$) capture and/or recovery at renewable natural gas (RNG) facilities and organic waste processing facilities, such as landfills and biodigesters. Disclosed herein are systems, apparatus, and methods that enable the capture of $CO_2$ from organic waste. The disclosed systems, apparatus, and methods may also enable the conversion of captured $CO_2$ into a usable form.

Systems depicted herein are depicted schematically, and depicted components thereof may be omitted and/or an omitted component may be added and/or substituted. For example, components to implement and/or adjust stream order and/or connection points (e.g., valves and/or manifolds) may be added, omitted, and/or substituted to implement described flow arrangements. In another example, pressurization components (e.g., a pump) may be added, for example to ensure desired flow rates and/or operating pressures are maintained, and/or depicted pressurization components may be omitted if they are not needed to support the desired flow rates and/or operating pressures for a particular embodiment.

It can be seen that embodiments herein can be configured for zero emissions, or stated differently, the source gas may be completely separated into a hydrocarbon product stream and a $CO_2$ product stream, with no significant mass vented from the system as a purge gas, effluent, or the like. In certain embodiments, for example where some components are removed in conditioning steps (e.g., $H_2S$, water, volatile organic compounds, etc.), a zero emission embodiment is one where the entire remainder of the source gas after the conditioning is separated into a hydrocarbon product stream and a $CO_2$ product stream, with no significant mass vented from the system. It will be understood that the embodiments herein provide for numerous benefits to gas recovery systems, and systems with zero emissions or with non-zero emissions are contemplated herein.

It can be seen that embodiments herein can be configured for minimum possible emissions, or stated differently the source gas may be completely separated into a hydrocarbon product stream, a $CO_2$ product stream, and a minimum amount of purge material that allows for the separation to be performed with sufficient gas quality for the hydrocarbon product stream and/or $CO_2$ product stream. For example, an adsorption component (e.g., a volatile organic compounds (VOC) pressure swing adsorber and/or temperature swing adsorber) may utilize flush gas to regenerate the adsorber, where the flush gas and entrained VOCs may be vented and/or oxidized to minimize flush gas emissions and prevent build-up of the VOCs (or other removed impurities) within the gas recovery system and/or as a significant fraction of either product stream. It will be understood that the embodiments herein provide for numerous benefits to gas recover systems, and system with minimum possible emissions, or with higher levels of emissions, are contemplated herein.

Selection of components, stream arrangements, or the like, for embodiments herein may be selected or implemented based on a number of factors, such as the existing biogas upgrading process being employed, the purity and/or cleanliness of the inlet gas (e.g., presence of trace compounds, contaminants, the product fraction of the inlet gas including natural gas and/or $CO_2$), the volume of methane and/or carbon dioxide that can potentially be re-captured, the intended utilization (e.g., on-site vs. shipping off-site), a comparison of grid electricity costs vs. using the methane to produce electricity on-site, the need or ability to use the electricity for non-$CO_2$ related uses, if returned methane (and/or natural gas) is desired as an outcome of the process, to meet one or more emissions requirements or comply with a policy, a capital expenditure associated with methane utilization, available space and/or infrastructure for new and/or upgraded equipment, a potential amount of revenue generated through renewable identification numbers (RINs) or other government incentive, an available transportation equipment, supply and demand for a given market, or the like.

Referring now to FIG. 1, an example gas recovery system 100 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 100 also includes a first membrane assembly 108 fluidly coupled to the conditioned source gas 140, and configured to separate the conditioned source gas 140 into a hydrocarbon-enriched stream 110 and a recovery stream 112. The example gas recovery system 100 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 100 also includes a carbon dioxide ($CO_2$) plant assembly 122 fluidly coupled to the recovery stream 112, and configured to provide a carbon dioxide product stream 124 and an enriched recycle stream 128. The example gas recovery system 100 also includes a standalone membrane assembly 134 at least selectively fluidly coupled to the enriched recycle stream 128, and configured to separate the enriched recycle stream 128 into a hydrocarbon-enriched recycle stream 130 and an effluent stream 132. An effluent stream, as utilized herein, should be understood broadly. In certain embodiments, an effluent stream is simply an identifier of a particular stream in the gas recovery system, which may be utilized in any manner, for example, and depending upon the composition of the effluent stream, an effluent stream may be vented, recycled to any component in the system, have energy recovery performed thereupon, or the like. In certain embodiments, the effluent stream 132 is depleted in hydrocarbons, and may be vented to the atmosphere, utilized as a gas flush for a swing adsorption component, and/or recycled to a $CO_2$ plant for additional recovery of any $CO_2$ constituent in the effluent stream 132.

The swing adsorption component 107 is at least selectively coupled to the enriched recycle stream 128 and/or the recovery stream 112, and the source gas conditioning assembly 101 is fluidly coupled to the recycle stream 120, and at least selectively coupled to the hydrocarbon-enriched recycle stream 130. In examples of the gas recovery system 100, the hydrocarbon-enriched recycle stream 130 includes a retentate of a standalone membrane of the standalone membrane assembly 134. The source gas conditioning assembly 101 includes a first fluid coupling to the hydrocarbon-enriched recycle stream 130 and a second fluid coupling to the recycle stream 120, and the first fluid coupling is downstream of the second fluid coupling. The first fluid coupling includes a higher average pressure position than the second fluid coupling. The first fluid coupling is downstream of the compressor component 106 of the source gas conditioning assembly 101. In examples of the gas recovery system 100, the recycle stream 120 includes a permeate of a second membrane of the second membrane assembly 114. In examples of the gas recovery system 100, the recovery stream 112 includes a permeate of a first membrane of the first membrane assembly 108. In examples of the gas recovery system 100, the enriched recycle stream 128 includes non-condensable gases from the $CO_2$ plant assembly 122. The enriched recycle stream 128 passes directly from the $CO_2$ plant assembly 122 to the standalone membrane assembly 134 without being pressurized. The $CO_2$ plant assembly 122 includes a carbon adsorption bed, a gas compression component, a gas dehydration component, and a liquefaction component. The enriched recycle stream 128 received at the swing adsorption component 107 comprises a flush stream, the system further comprising at least one of an energy recovery assembly or an oxidizer component fluidly coupled to the flush stream. In examples, there is an output 119 from the swing adsorption component 107. The gas recovery system 100 may include a valve 151. In embodiments throughout this disclosure, valves may be disposed in the system to facilitate flexible routing where any or all inputs to the valve can go to any or all outputs, including selectively.

A method of treating gas includes conditioning a source gas, optionally with a compression component and a swing adsorption component, separating the conditioned source gas into a hydrocarbon enriched stream and a recovery stream, separating the hydrocarbon enriched stream into a hydrocarbon product stream and a recycle stream, providing a carbon dioxide product stream and an enriched recycle stream via a carbon dioxide ($CO_2$) plant assembly fluidly coupled to the recovery stream, and separating the enriched recycle stream into a hydrocarbon enriched recycle stream and an effluent stream.

Figure 2:
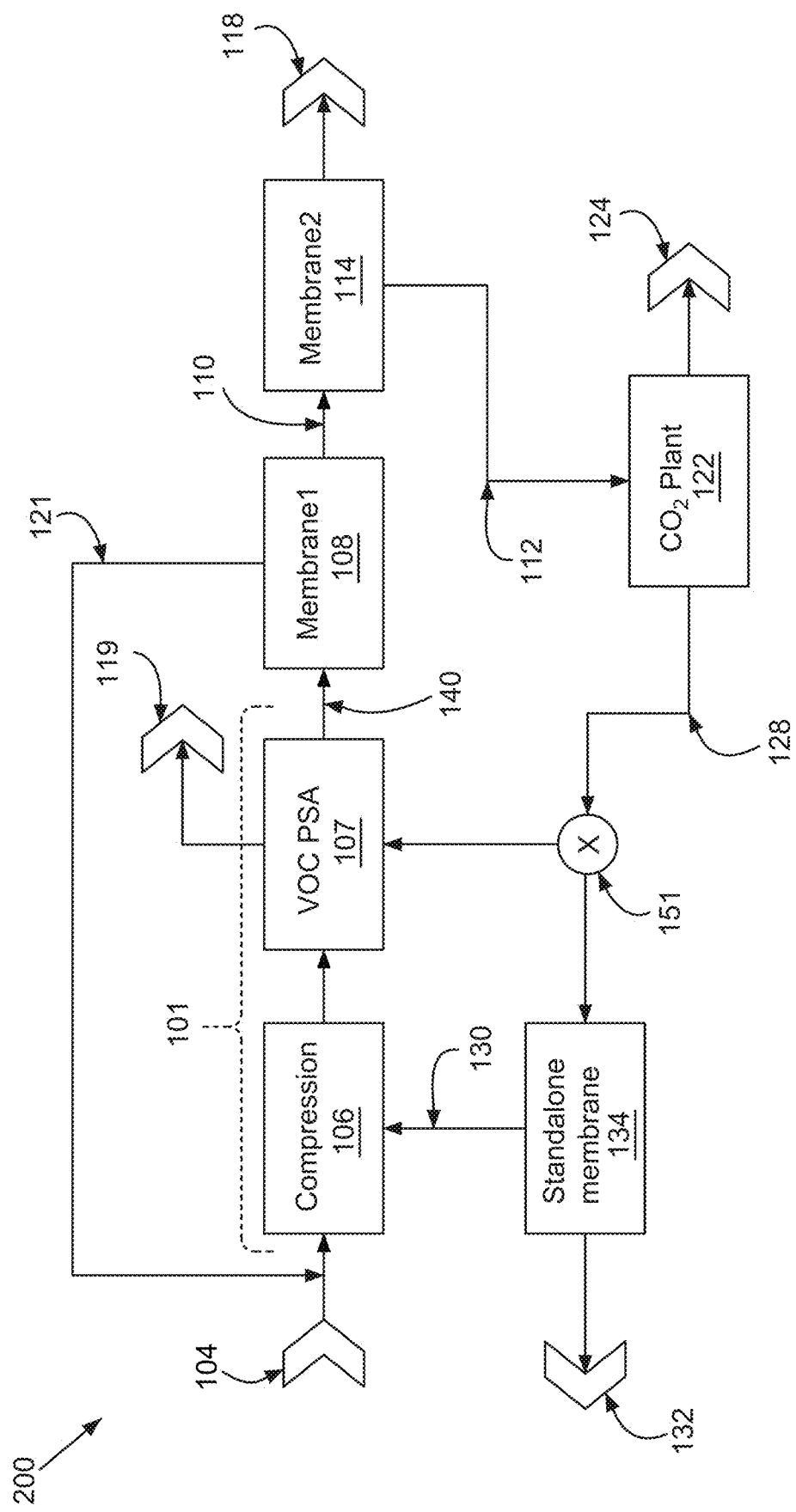
FIG. 2 depicts an example gas recovery system.

Referring now to FIG. 2, an example gas recovery system 200 includes a source gas conditioning assembly 101 fluidly coupled to an inlet source gas 104, the source gas conditioning assembly 101 comprising a compression component 106 and a swing adsorption component 107, and configured to provide a conditioned source gas 140. The example gas recovery system 200 also includes a first membrane assembly 108 fluidly coupled to the conditioned source gas 140, and configured to separate the conditioned source gas 140 into a hydrocarbon-enriched stream 110 and a recycle stream 121. The example gas recovery system 200 also includes a second membrane assembly 114 fluidly coupled to the hydrocarbon-enriched stream 110, and configured to separate the hydrocarbon-enriched stream 110 into a hydrocarbon product stream 118 and a recovery stream 112. The example gas recovery system 200 also includes a carbon dioxide ($CO_2$) plant assembly 122 fluidly coupled to the recovery stream 112, and configured to provide a carbon dioxide product stream 124 and an enriched recycle stream 128. The example gas recovery system 200 also includes a standalone membrane assembly 134 at least selectively fluidly coupled to the enriched recycle stream 128, and configured to separate the enriched recycle stream 128 into a hydrocarbon-enriched recycle stream 130 and an effluent stream 132. In the example gas recovery system 200, the swing adsorption component 107 is at least selectively coupled to the enriched recycle stream 128. The source gas conditioning assembly 101 is fluidly coupled to the recycle stream 121, and at least selectively coupled to the hydrocarbon-enriched recycle stream 130. In the example gas recovery system 200, the hydrocarbon-enriched recycle stream 130 includes a retentate of a standalone membrane of the standalone membrane assembly 134. The source gas conditioning assembly 101 includes a first fluid coupling to the hydrocarbon-enriched recycle stream 130 and a second fluid coupling to the recycle stream 121, and wherein the first fluid coupling is downstream of the second fluid coupling. The first fluid coupling includes a higher average pressure position than the second fluid coupling. The first fluid coupling is downstream of the compressor component 106 of the source gas conditioning assembly 101. The recycle stream 121 includes a permeate of a first membrane of the first membrane assembly 108. The recovery stream 112 includes a permeate of a first membrane of the second membrane assembly 114. The enriched recycle stream includes non-condensable gases from the $CO_2$ plant assembly 122. The enriched recycle stream 128 passes directly from the $CO_2$ plant assembly 122 to the standalone membrane assembly 134 without being pressurized. The $CO_2$ plant assembly 122 includes a carbon adsorption bed, a gas compression component, a gas dehydration component, and a liquefaction component. In this example and in others throughout this Specification, permeate of the first membrane assembly 108 and second membrane assembly 114 go to the $CO_2$ plant, but it should be understood that permeate from any part of the system may be directed to the $CO_2$ plant, including from at least three membranes, in some examples.

A method of treating gas includes conditioning a source gas, optionally with a compression component and a swing adsorption component, separating the conditioned source gas into a hydrocarbon enriched stream and a recycle stream, separating the hydrocarbon enriched stream into a hydrocarbon product stream and a recovery stream, providing a carbon dioxide product stream and an enriched recycle stream via a carbon dioxide ($CO_2$) plant assembly fluidly coupled to the recovery stream, and separating the enriched recycle stream into a hydrocarbon enriched recycle stream and an effluent stream.

Figure 3:
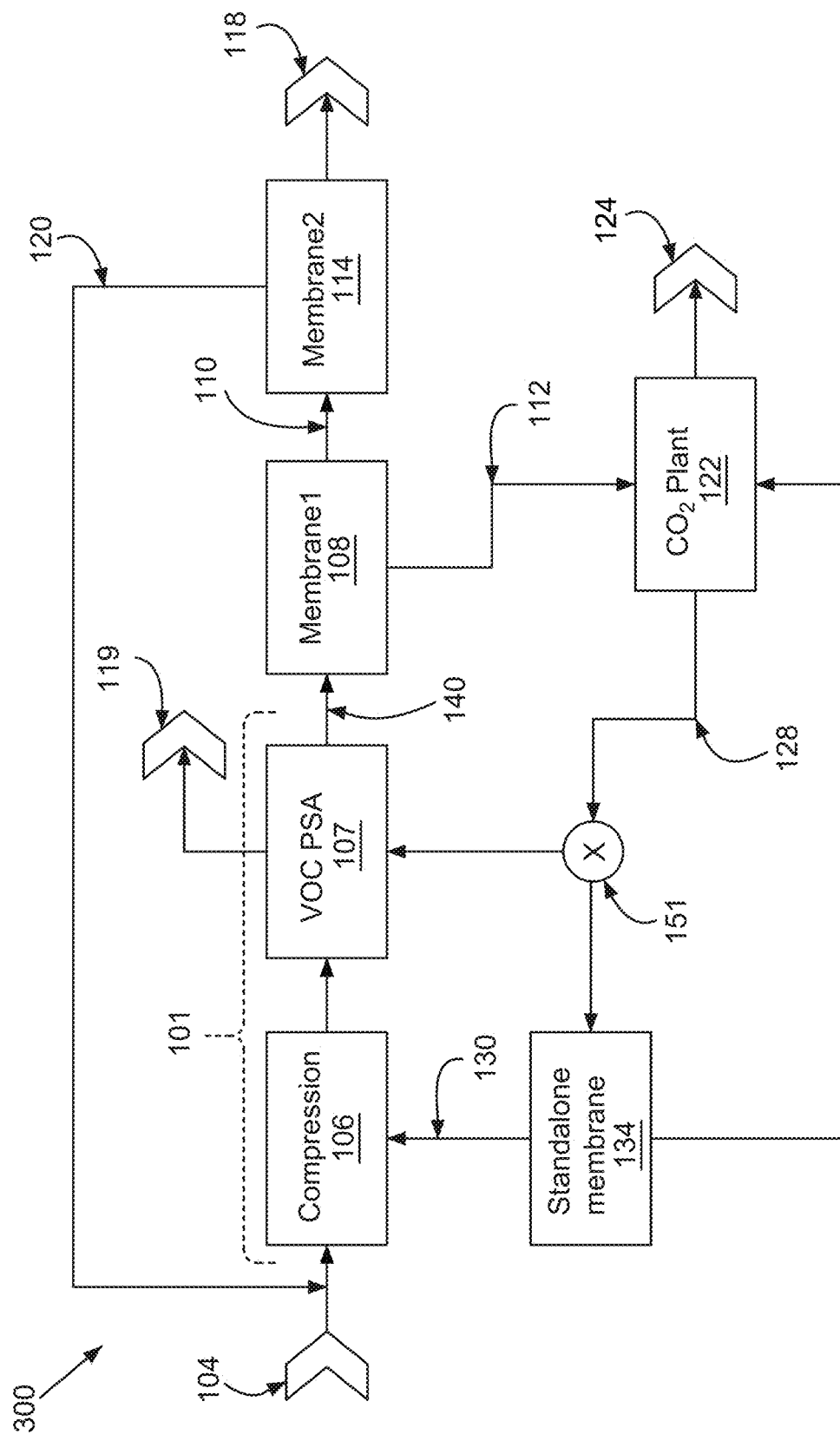
FIG. 3 depicts an example gas recovery system.

Referring now to FIG. 3, an example gas recovery system 300 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 300 also includes a first membrane assembly 108 fluidly coupled to the conditioned source gas 140, and configured to separate the conditioned source gas 140 into a hydrocarbon-enriched stream 110 and a recovery stream 112. The example gas recovery system 300 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 300 also includes a carbon dioxide ($CO_2$) plant assembly 122 fluidly coupled to the recovery stream 112, and configured to provide a carbon dioxide product stream 124 and an enriched recycle stream 128. The example gas recovery system 300 also includes a standalone membrane assembly 134 fluidly at least selectively coupled to the enriched recycle stream 128, and configured to separate the enriched recycle stream 128 into a hydrocarbon-enriched recycle stream 130 and a secondary recovery stream 301. The source gas conditioning assembly 101 is fluidly coupled to the recycle stream 120 and at least selectively coupled to the hydrocarbon-enriched recycle stream 130. The swing adsorption component 107 is at least selectively coupled to the enriched recycle stream 128 and/or the secondary recovery stream 301, and the $CO_2$ plant assembly 122 is at least selectively fluidly coupled to the secondary recovery stream 301. In the example gas recovery system 300, the hydrocarbon-enriched recycle stream 130 includes a retentate of a standalone membrane of the standalone membrane assembly 134. In the example gas recovery system 300, the source gas conditioning assembly 101 includes a first fluid coupling to the hydrocarbon-enriched recycle stream 130 and a second fluid coupling to the recycle stream 120, wherein the first fluid coupling is downstream of the second fluid coupling. The first fluid coupling includes a higher average pressure position than the second fluid coupling. The first fluid coupling is downstream of the compressor component 106 of the source gas conditioning assembly 101.

A method of treating gas includes conditioning a source gas via a compression component and a swing adsorption component to provide a conditioned source gas, separating the conditioned source gas into a hydrocarbon enriched stream and a recovery stream, separating the hydrocarbon enriched stream into a hydrocarbon product stream and a recycle stream, providing a carbon dioxide product stream and an enriched recycle stream via a carbon dioxide ($CO_2$) plant assembly fluidly coupled to the recovery stream, and separating the enriched recycle stream into a hydrocarbon enriched recycle stream and a secondary recovery stream.

Figure 4:
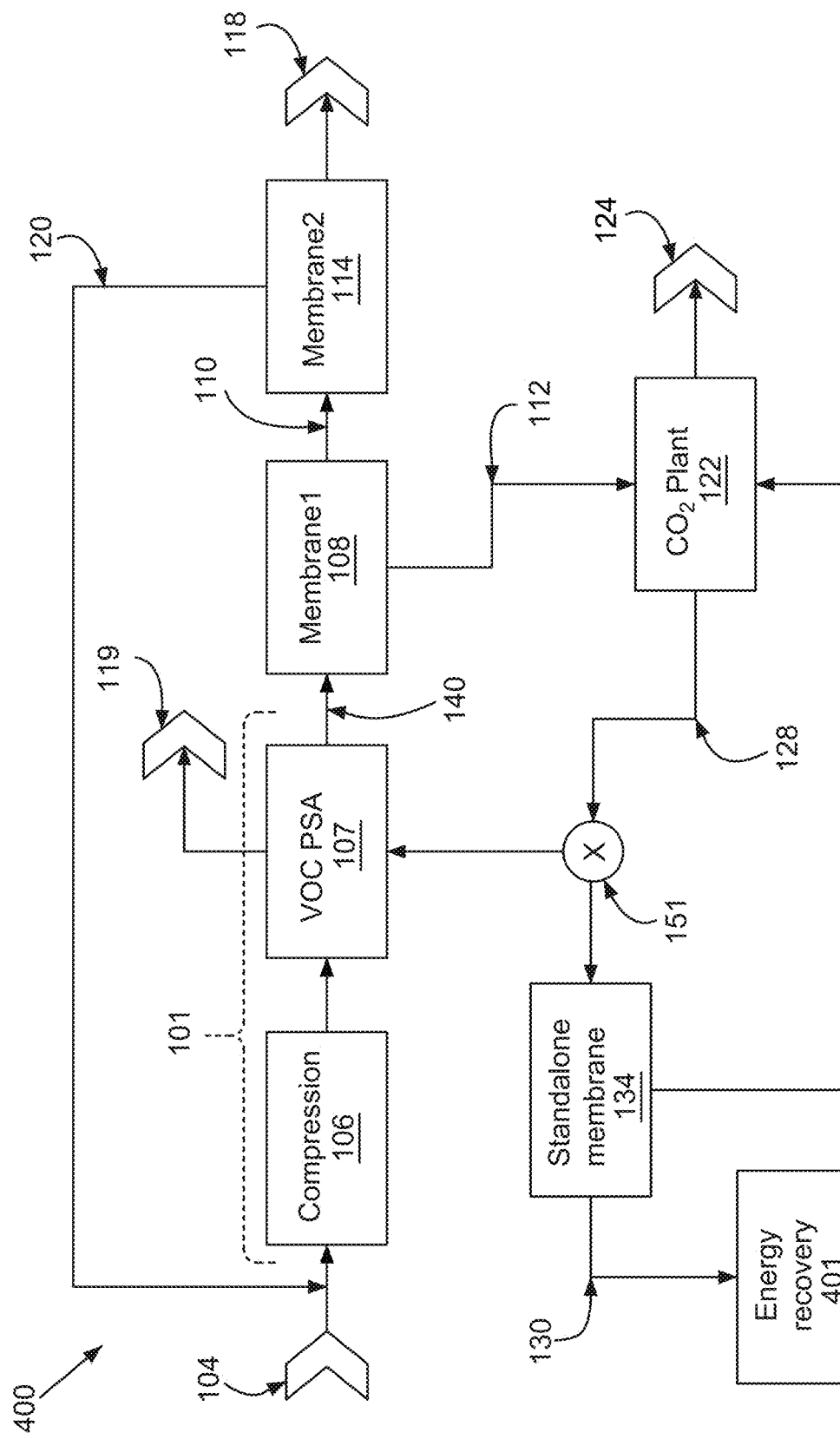
FIG. 4 depicts an example gas recovery system.

Referring now to FIG. 4, an example gas recovery system 400 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 400 also includes a first membrane assembly 108 fluidly coupled to the conditioned source gas 140, and configured to separate the conditioned source gas 140 into a hydrocarbon-enriched stream 110 and a recovery stream 112. The example gas recovery system 400 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 400 also includes a carbon dioxide ($CO_2$) plant assembly 122 fluidly coupled to the recovery stream 112, and configured to provide a carbon dioxide product stream 124 and an enriched recycle stream 128. The example gas recovery system 400 also includes a standalone membrane assembly 134 at least selectively fluidly coupled to the enriched recycle stream 128, and configured to separate the enriched recycle stream 128 into a hydrocarbon-enriched recycle stream 130 and a secondary recovery stream 301. The example gas recovery system 400 also includes an energy recovery assembly 401 fluidly coupled to the hydrocarbon-enriched recycle stream 130 and configured to extract energy therefrom. The source gas conditioning assembly 101 is fluidly coupled to the recycle stream 120, and at least selectively coupled to the enriched recycle stream 128. The $CO_2$ plant assembly 122 is fluidly coupled to the secondary recovery stream 301. The energy recovery assembly 401 include a burner, a fuel cell, or a generator.

A method of treating gas includes conditioning a source gas via a compression component and a swing adsorption component to provide a conditioned source gas, separating the conditioned source gas into a hydrocarbon enriched stream and a recovery stream, separating the hydrocarbon enriched stream into a hydrocarbon product stream and a recycle stream, providing a carbon dioxide product stream and an enriched recycle stream via a carbon dioxide ($CO_2$) plant assembly, separating the enriched recycle stream into a hydrocarbon enriched recycle stream and a secondary recovery stream, and extracting energy from the hydrocarbon enriched recycle stream.

Figure 5:
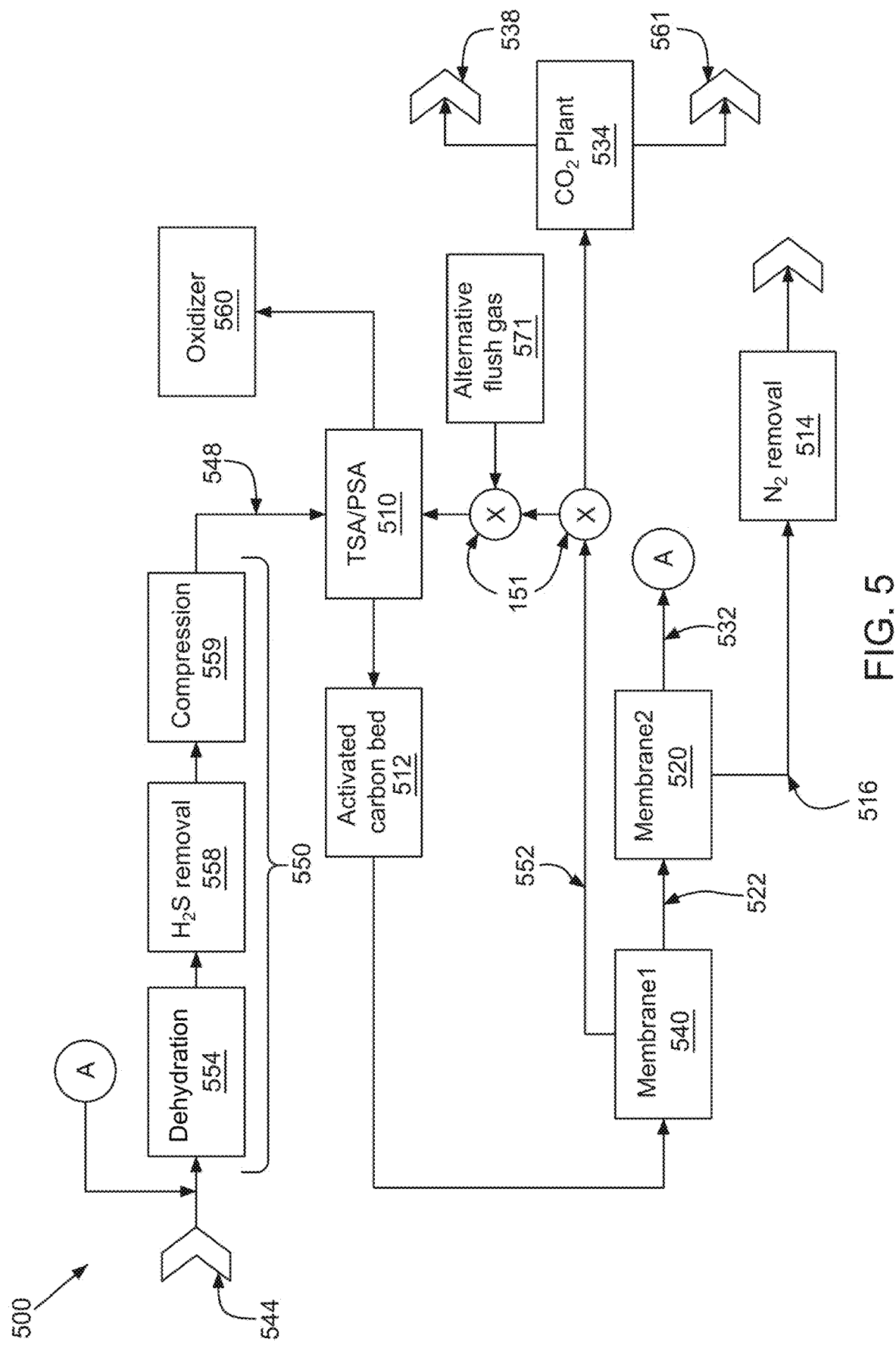
FIG. 5 depicts an example gas recovery system.

Referring to FIG. 5, an example gas recovery system 500 includes a source gas conditioning assembly 550 fluidly coupled to an inlet source gas 544, the source gas conditioning assembly 550 including a compression component 559 and a swing adsorption component 510, and configured to provide a conditioned source gas 548. Outputs from the swing adsorption component 510 can flow to the oxidizer 560 (e.g., for the flush gas) or activated carbon bed 512 (e.g., for the main operating stream from which $CO_2$ and hydrocarbons are being recovered). The example gas recovery system 500 also includes a first membrane assembly 540 fluidly coupled to the conditioned source gas 548, and configured to separate the conditioned source gas 548 into a hydrocarbon-enriched stream 522 and a recovery stream 552. The example gas recovery system 500 also includes a second membrane assembly 520 fluidly coupled to the hydrocarbon-enriched stream 522, and configured to separate the hydrocarbon-enriched stream 522 into a hydrocarbon product stream 516 and a recycle stream 532. The hydrocarbon product stream 516 may be treated by a nitrogen removal component 514. The example gas recovery system 500 also includes a carbon dioxide ($CO_2$) plant assembly 534 fluidly at least selectively coupled to the recovery stream 552, and configured to provide a carbon dioxide product stream 538 and a non-condensable stream 561 (e.g., recycle, flush, to a standalone membrane, energy recovery, vent, etc.). The source gas conditioning assembly 550 is fluidly coupled to the recycle stream 532. The source gas conditioning assembly 550 is fluidly coupled to the non-condensable stream 561. The example gas recovery system 500 further includes a standalone membrane assembly fluidly coupled to the non-condensable stream 561, and configured to separate the non-condensable stream 561 into a second recovery stream and an effluent stream. The source gas conditioning assembly 550 is fluidly coupled to the second recovery stream. The $CO_2$ plant assembly 534 is fluidly coupled to the effluent stream. The example gas recovery system 500 further includes an energy recovery assembly fluidly coupled to the second recovery stream. The source gas conditioning assembly 550 further includes an $H_2S$ removal component 558, a dehydration component 554, and an activated carbon bed 512. In the example gas recovery system 500, an alternative flush gas 571 is fluidly coupled to the valve 151.

A method of treating gas includes conditioning a source gas via a compression component and a swing adsorption component to provide a conditioned source gas, separating the conditioned source gas into a hydrocarbon enriched stream and a recovery stream, separating the hydrocarbon enriched stream into a hydrocarbon product stream and a recycle stream, providing a carbon dioxide product stream and a non-condensable stream via a carbon dioxide ($CO_2$) plant assembly fluidly at least selectively coupled to the recovery stream.

Figure 6:
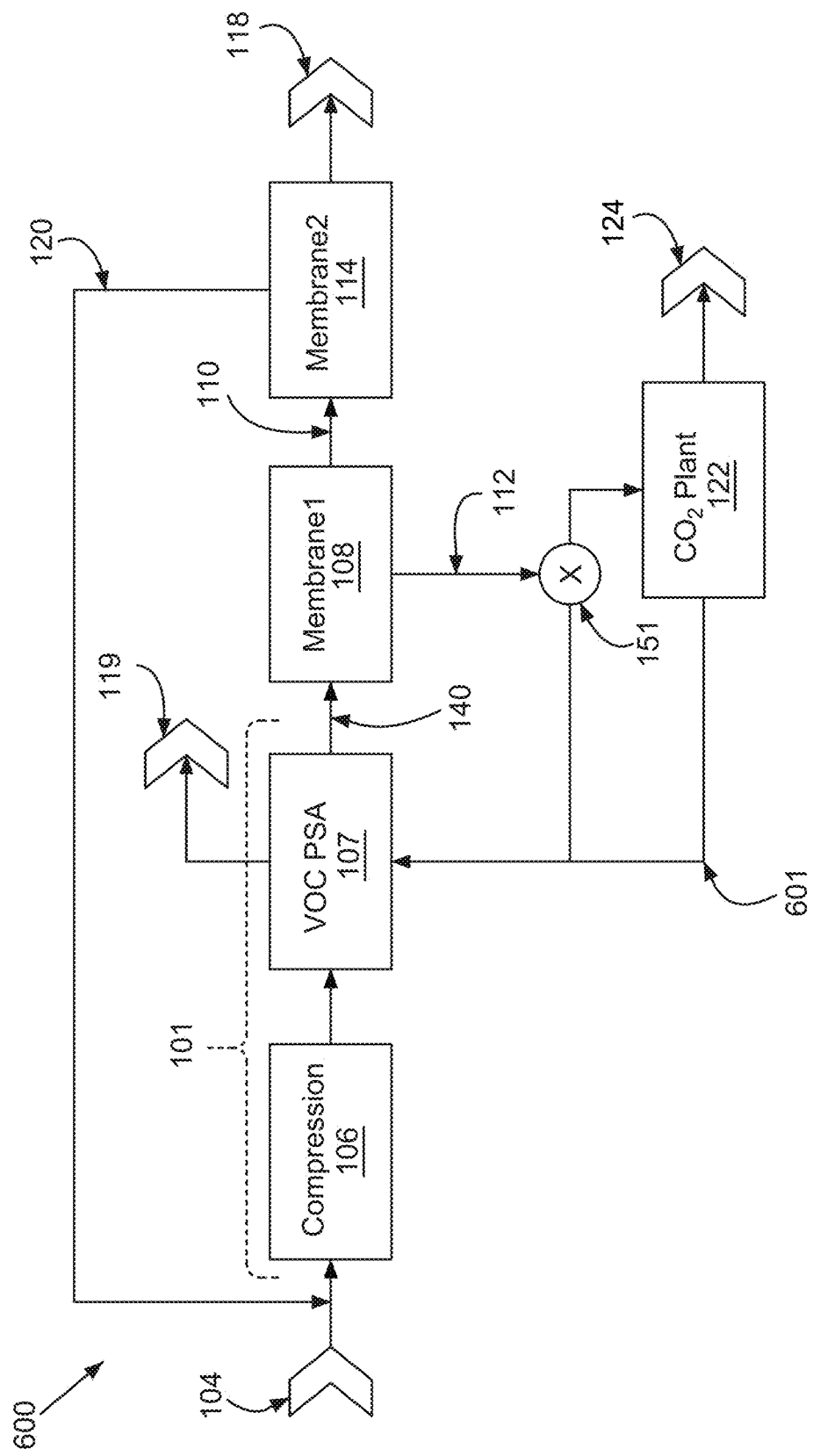
FIG. 6 depicts an example gas recovery system.

Referring now to FIG. 6, an example gas recovery system 600 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 600 also includes a first membrane assembly 108 fluidly coupled to the conditioned source gas 140, and configured to separate the conditioned source gas 140 into a hydrocarbon-enriched stream 110 and a recovery stream 112. The example gas recovery system 600 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 600 also includes a carbon dioxide ($CO_2$) plant assembly 122 fluidly at least selectively coupled to the recovery stream 112, and configured to provide a carbon dioxide product stream 124 and a non-condensable stream 601. The source gas conditioning assembly is fluidly coupled to the recycle stream 120, and the swing adsorption component 107 is at least selectively coupled to the recovery stream 112. In examples, the swing adsorption component 107 is at least selectively coupled to the non-condensable stream 601.

A method of treating gas includes conditioning a source gas via a compression component and a swing adsorption component to provide a conditioned source gas, separating the conditioned source gas into a hydrocarbon enriched stream and a recovery stream, separating the hydrocarbon enriched stream into a hydrocarbon product stream and a recycle stream, and providing a carbon dioxide product stream and a non-condensable stream via a carbon dioxide ($CO_2$) plant assembly fluidly at least selectively coupled to the recovery stream.

Figure 7:
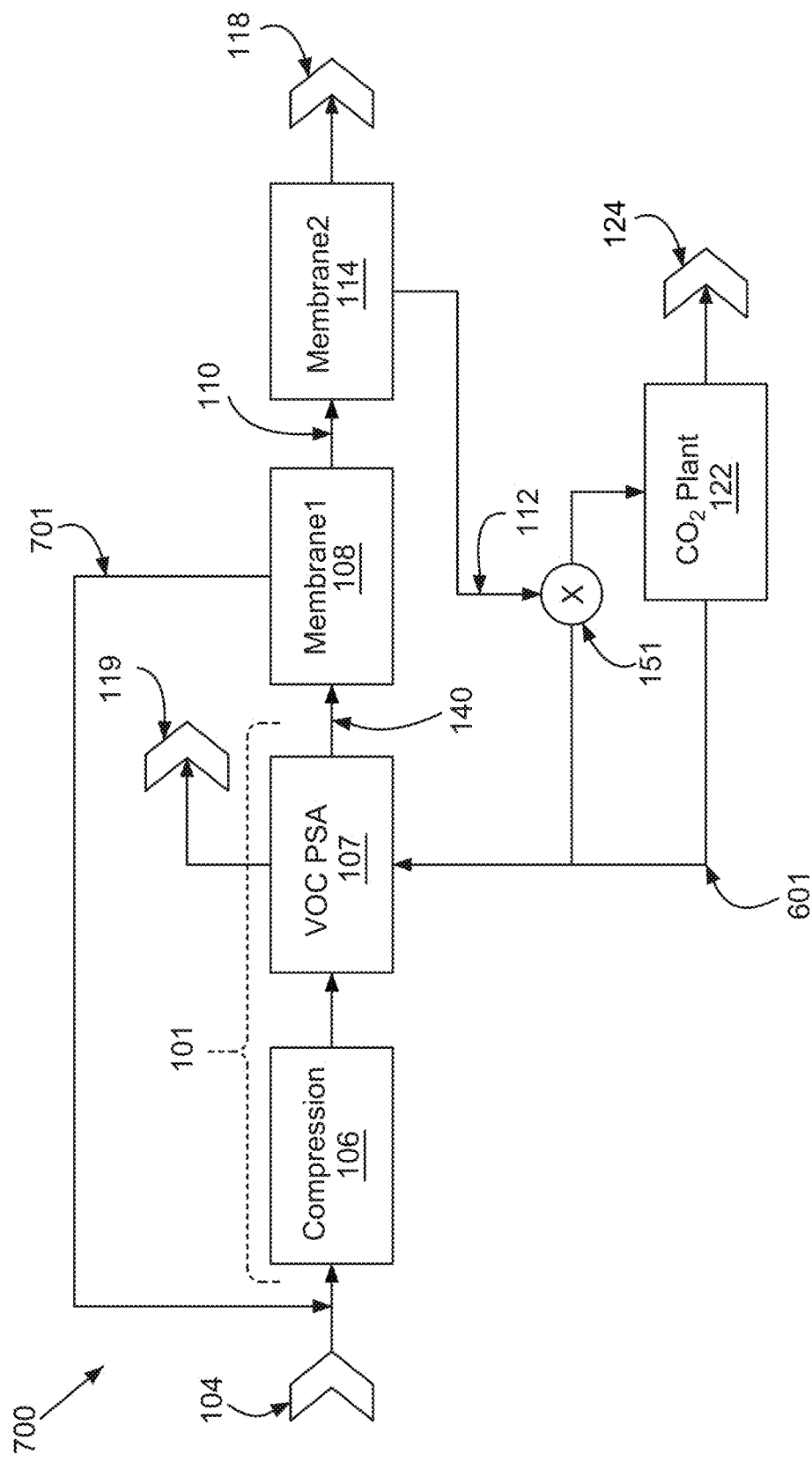
FIG. 7 depicts an example gas recovery system.

Referring to FIG. 7, an example gas recovery system 700 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 700 also includes a first membrane assembly 108 fluidly coupled to the conditioned source gas 140, and configured to separate the conditioned source gas 140 into a hydrocarbon-enriched stream 110 and a recycle stream 701. The example gas recovery system 700 also includes a second membrane assembly 114 fluidly coupled to the hydrocarbon-enriched stream 110, and configured to separate the hydrocarbon-enriched stream 110 into a hydrocarbon product stream 118 and a recovery stream 112. The example gas recovery system 700 also includes a carbon dioxide ($CO_2$) plant assembly 122 fluidly at least selectively coupled to the recovery stream 112, and configured to provide a carbon dioxide product stream 124 and a non-condensable stream 601. In examples, the source gas conditioning assembly 101 is fluidly coupled to the recycle stream 701, and the swing adsorption component 107 is at least selectively coupled to the recovery stream 112. In examples, the swing adsorption component 107 is at least selectively coupled to the non-condensable stream 601.

A method of treating gas includes conditioning a source gas via a compression component and a swing adsorption component to provide a conditioned source gas, separating the conditioned source gas into a hydrocarbon enriched stream and a recycle stream, separating the hydrocarbon enriched stream into a hydrocarbon product stream and a recovery stream, and providing a carbon dioxide product stream and a non-condensable stream via a carbon dioxide ($CO_2$) plant assembly fluidly at least selectively coupled to the recovery stream.

Figure 8:
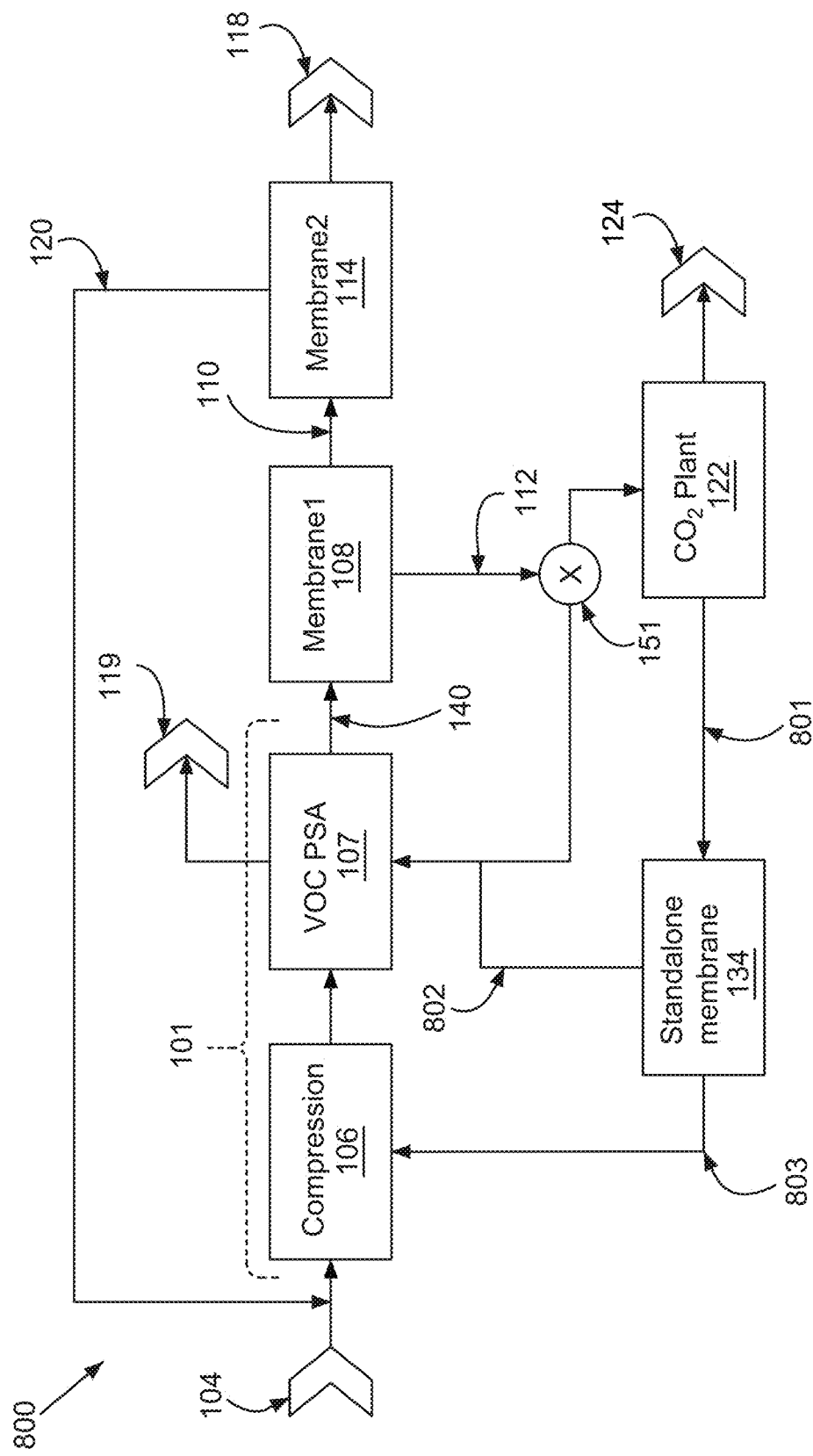
FIG. 8 depicts an example gas recovery system.

Referring now to FIG. 8, an example gas recovery system 800 includes a source gas conditioning assembly 101 fluidly coupled to an inlet source gas 104, the source gas conditioning assembly 101 comprising a compression component 106 and a swing adsorption component 107, and configured to provide a conditioned source gas 140. The example gas recovery system 800 also includes a first membrane assembly 108 fluidly coupled to the conditioned source gas 140, and configured to separate the conditioned source gas 140 into a hydrocarbon-enriched stream 110 and a recovery stream 112. The example gas recovery system 800 also includes a second membrane assembly 114 fluidly coupled to the hydrocarbon-enriched stream 110, and configured to separate the hydrocarbon-enriched stream 110 into a hydrocarbon product stream 118 and a recycle stream 120. The example gas recovery system 800 also includes a carbon dioxide ($CO_2$) plant assembly 122 fluidly at least selectively coupled to the recovery stream 112, and configured to provide a carbon dioxide product stream 124 and a non-condensable stream 801. The example gas recovery system 800 also includes a standalone membrane assembly 134 fluidly coupled to the non-condensable stream 801, and configured to separate the non-condensable stream 801 into a flush gas stream 802 and a hydrocarbon-enriched recycle stream 803. In examples, the source gas conditioning assembly 101 is fluidly coupled to the recycle stream 120 and the hydrocarbon-enriched recycle stream 803. In examples, the swing adsorption component 107 is fluidly coupled to the flush gas stream 802. In examples, the swing adsorption component 107 is at least selectively coupled to the recovery stream 112.

A method of treating gas includes conditioning a source gas via a compression component and a swing adsorption component to provide a conditioned source gas, separating the conditioned source gas into a hydrocarbon enriched stream and a recovery stream, separating the hydrocarbon enriched stream into a hydrocarbon product stream and a recycle stream, providing a carbon dioxide product stream and a non-condensable stream via a carbon dioxide ($CO_2$) plant assembly fluidly at least selectively coupled to the recovery stream, and separating the non-condensable stream into a flush gas stream and a hydrocarbon enriched recycle stream.

Figure 9:
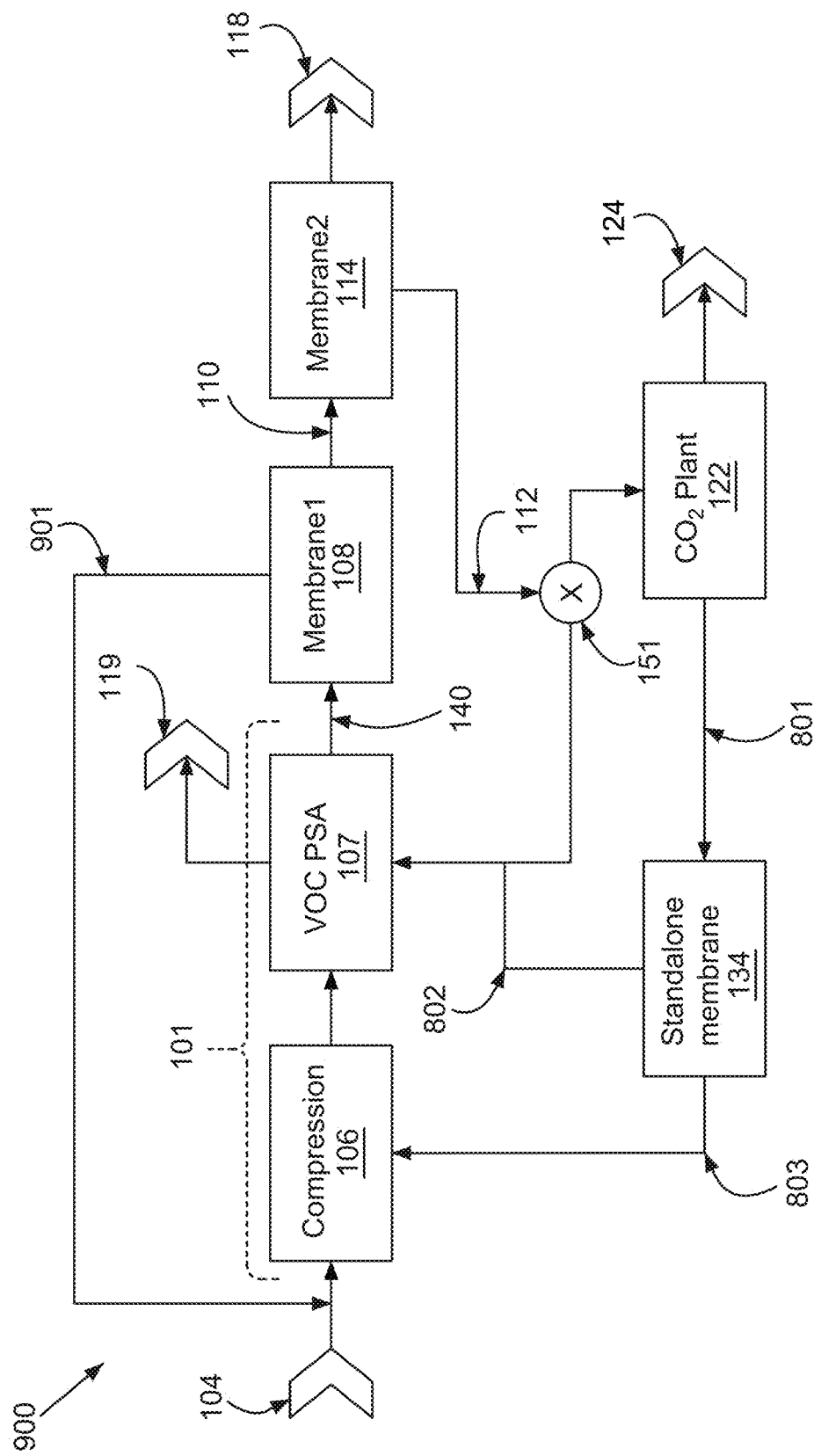
FIG. 9 depicts an example gas recovery system.

Referring to FIG. 9, an example gas recovery system 900 includes a source gas conditioning assembly 101 fluidly coupled to an inlet source gas 104, the source gas conditioning assembly 101 including a compression component 106 and a swing adsorption component 107, and configured to provide a conditioned source gas 140. The example gas recovery system 900 also includes a first membrane assembly 108 fluidly coupled to the conditioned source gas 140, and configured to separate the conditioned source gas 140 into a hydrocarbon-enriched stream 110 and a recycle stream 901. The example gas recovery system 900 also includes a second membrane assembly 114 fluidly coupled to the hydrocarbon-enriched stream 110, and configured to separate the hydrocarbon-enriched stream 110 into a hydrocarbon product stream 118 and a recovery stream 112. The example gas recovery system 900 also includes a carbon dioxide ($CO_2$) plant assembly 122 fluidly at least selectively coupled to the recovery stream 112, and configured to provide a carbon dioxide product stream 124 and a non-condensable stream 801. The example gas recovery system 900 also includes a standalone membrane assembly 134 fluidly coupled to the non-condensable stream 801, and configured to separate the non-condensable stream 801 into a flush gas stream 802 and a hydrocarbon-enriched recycle stream 803. The source gas conditioning assembly 101 is fluidly coupled to the recycle stream 901 and the hydrocarbon-enriched recycle stream 803. In examples, the swing adsorption component 107 is fluidly coupled to the flush gas stream 802. In examples, the swing adsorption component 107 is at least selectively coupled to the recovery stream 112.

A method of treating gas includes conditioning a source gas via a compression component and a swing adsorption component to provide a conditioned source gas, separating the conditioned source gas into a hydrocarbon enriched stream and a recycle stream, separating the hydrocarbon enriched stream into a hydrocarbon product stream and a recovery stream, providing a carbon dioxide product stream and a non-condensable stream via a carbon dioxide ($CO_2$) plant assembly fluidly at least selectively coupled to the recovery stream, and separating the non-condensable stream into a flush gas stream and a hydrocarbon enriched recycle stream.

Embodiments herein provide for systems, procedures, and/or apparatuses for providing recovered process streams for renewable natural gas recovery and/or upgrading. Aspects of the present disclosure reference "natural gas" for clarity of the description. The term "natural gas" should be understood broadly, and includes renewable natural gas, landfill gas, fossil fuel natural gas, gas from biodigesters, and the like. Example recovered process streams include, without limitation, improved natural gas recovery (e.g., volume, composition, and/or recovery cost), secondary natural gas recovery, and/or carbon dioxide product recovery. In certain embodiments, example systems, procedures, and/or apparatuses for renewable natural gas recovery are applicable to any type of natural gas stream, and/or gas stream including typical natural gas constituents (e.g., low carbon count hydrocarbons, such as methane, ethane, propane, butane, etc.) as a major portion thereof, including for example processing of landfill gases, or any other type of gases, such as biogas, coming from certain food waste streams, farm product streams, manure sources, waste treatment plants, wineries, and/or any facility having organic waste associated therewith. Example and non-limiting product streams for embodiments herein include, without limitation, one or more of a primary natural gas stream, a secondary natural gas stream, and/or a carbon dioxide stream. In certain embodiments, a product stream, as utilized herein, may be provided as an explicit product stream (e.g., provided to an external system, such as a natural gas pipeline, etc.), utilized internally (e.g., in a burner, as a constituent supply stream, for in-situ electricity generation, etc.), stored for later delivery and/or utilization, etc. The description herein referencing a product stream should be understood broadly, where a product stream includes any stream that has been processed herein and is ready for utilization or further processing for a purpose.

The description herein referencing certain streams as a permeate stream and/or a retentate stream are non-limiting examples for clarity of the present description. The number and arrangement of membranes, streams, and the like, is dependent upon the constituents of various streams, the characteristics of the membranes utilized (e.g., selectivity, permeability to various constituents being separated, operating pressures, etc.), system pressures, temperatures, and/or flow rates, or the like. The description herein referencing certain streams as product streams, permeate streams, retentate streams, intermediate streams, recycle streams, recovery streams, or the like, are non-limiting examples provided for clarity of the present description. Arrangements depicted herein, including arrangements described herein and/or consistent with descriptions herein, are non-limiting examples, and can be adjusted as described herein and/or as understood to one of skill in the art having the benefit of the present disclosure, and further such arrangements are not limited to naming conventions utilized herein.

Gas separation and purification processes may be used to maximize the value of carbon dioxide ($CO_2$) capture and/or recovery at renewable natural gas (RNG) facilities and organic waste processing facilities, such as landfills and biodigesters. Disclosed herein are systems, apparatus, and methods that enable the capture of $CO_2$ from organic waste. The disclosed systems, apparatus, and methods may also enable the conversion of captured $CO_2$ into a usable form.

Systems depicted herein are depicted schematically, and depicted components thereof may be omitted and/or an omitted component may be added and/or substituted. For example, components to implement and/or adjust stream order and/or connection points (e.g., valves and/or manifolds) may be added, omitted, and/or substituted to implement described flow arrangements. In another example, pressurization components (e.g., a pump) may be added, for example to ensure desired flow rates and/or operating pressures are maintained, and/or depicted pressurization components may be omitted if they are not needed to support the desired flow rates and/or operating pressures for a particular embodiment.

It can be seen that embodiments herein can be configured for zero emissions, or stated differently, the source gas may be completely separated into a hydrocarbon product stream and a $CO_2$ product stream, with no significant mass vented from the system as a purge gas, effluent, or the like. In certain embodiments, for example where some components are removed in conditioning steps (e.g., $H_2S$, water, volatile organic compounds, etc.), a zero emission embodiment is one where the entire remainder of the source gas after the conditioning is separated into a hydrocarbon product stream and a $CO_2$ product stream, with no significant mass vented from the system. It will be understood that the embodiments herein provide for numerous benefits to gas recovery systems, and systems with zero emissions or with non-zero emissions are contemplated herein.

Selection of components, stream arrangements, or the like, for embodiments herein may be selected or implemented based on a number of factors, such as the existing biogas upgrading process being employed, the purity and/or cleanliness of the inlet gas (e.g., presence of trace compounds, contaminants, the product fraction of the inlet gas including natural gas and/or $CO_2$), the volume of methane and/or carbon dioxide that can potentially be re-captured, the intended utilization (e.g., on-site vs. shipping off-site), a comparison of grid electricity costs vs. using the methane to produce electricity on-site, the need or ability to use the electricity for non-$CO_2$ related uses, if returned methane (and/or natural gas) is desired as an outcome of the process, to meet one or more emissions requirements or comply with a policy, a capital expenditure associated with methane utilization, available space and/or infrastructure for new and/or upgraded equipment, a potential amount of revenue generated through renewable identification numbers (RINs) or other government incentive, an available transportation equipment, supply and demand for a given market, or the like.

An example 2-stage renewable natural gas (RNG) upgrading process is described following, which may be embodied in whole or part by embodiments throughout the present disclosure. The depicted process utilizes a two-stage membrane system, such as is used in biodigesters such as dairy waste digesters, food waste digesters, poultry processing plants, wastewater treatment plants, or the like. A biogas inlet stream from a digester is received, for example as a source gas. The process includes a purification and gas conditioning component, for example removing certain gas constituents (e.g., $H_2S$, sulfur, volatile organic compounds, etc.), dehydration, pressurization, or the like. The biogas is compressed after which it moves through two stages of membranes. The selected pressures and temperature of the outlet biogas may be configured according to the membrane components utilized, which will be understood to the person of skill in the art having the benefit of the present disclosure and information ordinarily available when contemplating a particular system, for example such information including: the composition of the biogas, the desired separation efficiency and/or degree of separation, membrane characteristics, subsequent treatment for the retentate, and/or subsequent treatment for the permeate. The membranes may be hollow fiber membranes or any other suitable, at least partially permeable technology, and may exhibit durability, such as having a lifespan on the order of years (e.g., 3 to 10 years) and selectivity for desired molecules/compounds and/or molecule/compound sizes. Material that passes through the membrane, due to its size or other characteristic, may be known as permeate, while material that does not pass through the membrane, and is therefore retained within the system, may be known as retentate. Any particular arrangements set forth herein are non-limiting examples—for example the permeate and/or retentate in any embodiments may be reversed, the annular stream may be a central stream, and/or membrane arrangements may include cylindrical membranes or any other physical arrangement of the membrane (e.g., planar membranes, rectangular membranes, etc.). The particular arrangement of membranes, physical form of the membranes, utilization of streams as permeate and/or retentate streams, and the like can readily be configured by one of skill in the art according to the available physical components, composition of streams, characteristics of membrane(s), or the like. The permeate may collect at an annulus of the membrane, depending upon the physical configuration of the membrane system, and may be removed from the annulus. Gas flow through the membrane may be in the direction of the hollow fibers. In practice, the membrane may be situated within a system, such as in a pipe, where headers for gas distribution and collection may be on either side of the membrane. The example system is a two-stage membrane system, but may include three membranes, with recycle locations (e.g., gases recycled to be combined with the source gas) selected from any of the three membranes, and/or recovery locations (e.g., gases provided to a $CO_2$ plant assembly for $CO_2$ recovery) from any one or two of the three membranes. In certain embodiments, a single membrane system provides a hydrocarbon product stream directly, and a separate recovery stream that is provided to a $CO_2$ plant assembly, which may be ultimately recycled (e.g., as a non-condensable stream from the $CO_2$ plant assembly, to a standalone membrane, with the hydrocarbon enriched portion of the standalone membrane separation being recycled).

The example system includes a highly purified methane ($CH_4$) slip stream return via a standalone membrane unit. The depicted process includes returning excess methane slip that has been removed as part of the $CO_2$ plant liquefaction process to the RNG producer at high purity to ensure maximum value creation and emission reduction at the site. The return of the methane at high purity improves the process efficiency of the biogas upgrading equipment. The methane slip is purified with a standalone membrane unit as part of the $CO_2$ recovery process enabling both the recycling of methane with the recovery of $CO_2$ for potentially revenue-generating end uses. This enables the RNG producer to achieve essentially 100% methane capture and use. The effluent stream (e.g., the permeate, where the retentate is recycled) may be vented, have an energy capture operation (e.g., oxidizing any remaining hydrocarbons and/or operating a fuel cell) performed on it, and/or recycled to the $CO_2$ plant assembly to further extract any remaining $CO_2$. The permeate may have a high fraction of $CO_2$, such as 90% or greater.

An example $CO_2$ plant assembly includes one or more of: polishing of raw $CO_2$ with carbon beds (e.g., to remove VOC's and sulfur), other gas conditioning processes, $CO_2$ compression (e.g., to 300 psi), liquid removal (e.g., drying to −56 degrees dew point), cooling (e.g., using a refrigerant, cooling to ~−25 degrees centigrade), liquefaction (e.g., in a stripper column), or non-condensable gas (e.g., methane, oxygen, nitrogen) removal from the stripper column. The $CO_2$ plant assembly may produce purified liquid $CO_2$ from a re-boiler, such as a purity of greater than 99.9%. In some embodiments, the purified $CO_2$ is directed to storage tanks, and/or otherwise passed into a $CO_2$ utilization and/or storage system. In addition to providing higher recovery of methane and capture of $CO_2$ that would otherwise be vented, and at high purity, example systems herein further reduce the operating cost of the RNG plant (e.g., to support higher recycle rates), and increase the capacity of the RNG plant (e.g., allowing a greater portion of the steady state flow through the system to be realized as product stream, e.g., due to the lower recycle rates).

The non-condensable gases from the $CO_2$ plant assembly, also known as purge gas, which may be a mixture of $CO_2$ and $CH_4$, such as a +/−25% $CH_4$, 75% $CO_2$ mixture, may be removed from a stripper column of the $CO_2$ plant assembly at high pressure (e.g., 18 bar, 300 psi). The purge gas may be recycled to the source gas, but the purge gas pressure may need to be let down. In certain embodiments, the purge gas is directed to a standalone membrane, where the elevated pressure effectively operates the standalone membrane, potentially with no additional pressurization. The utilization of the standalone membrane results in greater recovery of $CH_4$ using less input energy to the process since waste purge stream pressure, also known as waste compression energy, from the $CO_2$ plant assembly is recovered and used to drive the stand-alone membrane unit to separate $CO_2$ and methane. Recovery of this waste purge stream pressure enables a more economical recovery of purified, commercially usable, methane. By leveraging the waste pressure of the purge stream, no additional energy needs to be added to the methane slip stream to process the stream through the standalone membrane unit. The pressure available in the waste stream, which is typically wasted, is utilized to further purify the overall waste stream into high purity streams: a high pressure $CH_4$ stream (e.g., the retentate), and a low pressure $CO_2$ stream (e.g., the permeate). This high pressure, high purity $CH_4$ stream can be used for many commercial purposes, such as injection into pipeline, use as an on-site fuel, use in a fuel cell, re-injected into the RNG upgrading process (e.g., at the front end, before compression, after compression, between the first and second stage membranes, etc.), use in a combined heat and power (CHP) system, or the like. In one example, the retentate from the stand-alone membrane unit is returned to the RNG inlet to be combined with the source gas.

Non-condensable gases purged from the $CO_2$ plant assembly that are not processed through the stand-alone membrane unit may not be suitable to be returned to the process with the conditioned source gas, but may be returned upstream of conditioning components before recycling, and/or may be vented. The retentate may have a variable composition, such as 98% $CH_4$/2% $CO_2$, 90% $CH_4$/10% $CO_2$, 85% $CH_4$/15% $CO_2$, or the like. In embodiments, the composition may be selectable based on a number of factors, such as the size of the membrane, the pressure of the purge gas stream, the temperature of the purge gas stream, the quality of the biogas inlet stream, or the like. In some embodiments, there may be a waste stream of $CO_2$ or non-condensables from the stand-alone membrane unit.

Another example 2-stage renewable natural gas (RNG) upgrading process is described following. The example process includes passing the low pressure $CO_2$ stream from a standalone membrane back to the $CO_2$ plant assembly as a recycle, improving the overall $CO_2$ recovery of the system. The low pressure $CO_2$ stream from the standalone membrane may have a significant $CO_2$ fraction (e.g., 90% or greater), and can significantly increase $CO_2$ recovery with the recycle to the $CO_2$ plant assembly. In the example system, both methane and carbon dioxide may be recovered at high rates, such as nearly or equal to 100%, during the RNG upgrading process. In some embodiments, the pressure of the membrane may be varied to achieve specific outcomes for $CH_4$ and $CO_2$ recovery. For example, the pressure on the stand-alone membrane may be optimized to achieve a particular level of methane and/or carbon dioxide suitable for a particular intended use or application, and/or to balance stream flow rates, recycle rates, or the like to achieve the desired recovery fraction.

In certain embodiments, the utilization of an additional recycle of the membrane permeate to the $CO_2$ plant assembly enhances the overall $CO_2$ recovery of the system. The amount of additional $CO_2$ recovery depends upon several variables in the system, including the purity of the $CO_2$ feedgas (the membrane permeate to the $CO_2$ plant assembly). An example system having a 97% $CO_2$ purity will result in about 10% additional $CO_2$ recovery. Another example system having an 88% $CO_2$ purity will result in about 42% additional $CO_2$ recovery. The actual amount of additional $CO_2$ recovery for a given system will depend on a number of factors, for example the temperatures of streams in the system, the pressure drop across various separation membranes, and/or the properties of various separation membranes. The utilization of the additional recycle of the membrane permeate to the $CO_2$ plant assembly may enhance operations of the $CO_2$ plant assembly, for example by increasing the average $CO_2$ purity of streams being processed by the $CO_2$ plant assembly. The utilization of the additional recycle of the membrane permeate to the $CO_2$ plant assembly allows for manipulation of energy usage and/or sub-assembly capability of various parts of the overall system, the membrane units, thereby allowing the system to be adapted to the composition of feedgas and the priorities for the system (e.g., operational costs, capital costs, energy costs, maintenance costs, etc.).

Another example 2-stage renewable natural gas (RNG) upgrading process is described following. The example process involves a two-stage membrane system such as is used in biodigesters such as dairy waste digesters, food waste digesters, poultry processing plants, wastewater treatment plants, or the like. The example process includes a highly purified methane ($CH_4$) slip stream via a standalone membrane unit, which is passed to an energy recovery device. The energy recovery device may be a fuel cell (e.g., operating on methane), a burner, an oxidizer, a generator (e.g., driven by the thermal, chemical, and/or mechanical residual energy in the slip stream), and/or any other energy recovery device. The permeate from the standalone membrane may be recaptured and directed back to the $CO_2$ plant, and/or may be vented. In certain embodiments, the permeate from the standalone membrane may be utilized as a flush gas, for example where a temperature and/or pressure swing adsorber component is included as a conditioning component for the source gas.

Another example RNG upgrading process is described following. In certain embodiments, a system of the process includes an adsorption component to condition the source gas, for example to remove volatile organic compounds (VOCs) from the source gas before application to membrane separation. Adsorption components often utilize a pressure swing and/or temperature swing operation to switch between capture and regenerate operating modes, periodically purging the captured VOCs (or other constituents) using a flush gas. In certain embodiments, multiple VOC components may be operated in parallel, for example allowing components to regenerate the adsorber without requiring a shutdown of operations. The example RNG upgrading process includes utilization of a stream as flush gas for the VOC component of the source gas conditioning, for example a permeate stream of the first membrane, and/or a permeate stream of the second membrane.

A further example RNG upgrading process includes landfill gas (LFG) entering the process as an inlet stream, is dehydrated, and hydrogen sulfide ($H_2S$) is removed. The stream is directed to a thermal or pressure swing absorption vessel (TSA/PSA) to remove VOC content and any trace siloxane, after which the stream proceeds to activated carbon beds for further polishing and is then directed to a first stage membrane, and then a second stage membrane to remove $CO_2$, oxygen, and nitrogen. In some embodiments, the stream from the TSA/PSA during flush operations is directed to a thermal oxidizer (TOX). In some embodiments, the $1^{st}$ stage membrane permeate is directed back to flush the TSA/PSA and then is directed to the TOX. In some embodiments, the second stage membrane permeate is returned to the RNG inlet before dehydration. The retentate from the second stage membrane is directed to a nitrogen removal component and provided as a hydrocarbon product stream, leaving the system. In certain embodiments, finishing operations for the hydrocarbon product stream, such as an N2 removal operation, may be a part of the system (e.g., hydrocarbon product stream is ready for a pipeline or other system), or not a part of the system (e.g., hydrocarbon product stream is ready for a finishing operation).

Another example RNG upgrading process is described following. Instead of the $1^{st}$ stage membrane permeate being used to flush the PSA/TSA, which would re-contaminate the $CO_2$ stream with impurities, the permeate is sent to a $CO_2$ liquefaction plant (e.g., to the $CO_2$ plant) to recover and capture $CO_2$ and, in its place, an alternate flush gas (e.g., nitrogen, ambient air, argon, helium, other inert gas) is used on the TSA/PSA.

An example RNG producer system from LFG is disclosed. In the example, the permeate stream from Stage 1 is provided to a $CO_2$ recovery plant, and utilized as needed as an inert purge gas for recovery operations of the adsorbers of the adsorption stage. The $CO_2$ recovery plant produces a high purity liquid $CO_2$ stream as a product, and purges non-condensable gases from the $CO_2$ recovery plant to be utilized as a part of the inert purge gas for recovery operations of the adsorbers of the adsorption stage. The permeate stream from Stage 2 is recycled to the intake of the LFG compressor.

Compositions of various streams of the example system are disclosed. The non-condensable gas stream from the $CO_2$ recovery plant includes the bulk of the non-$CO_2$ constituents of the permeate stream from Stage 1. The $CO_2$ product stream from the $CO_2$ recovery plant is a nearly pure $CO_2$ product stream, and it can be seen that the bulk of the overall $CO_2$ in the system is recovered in the $CO_2$ product stream.

Another example RNG producer system from LFG is disclosed. A secondary $CH_4$ recovery component is included to treat the purge stream of the $CO_2$ recovery plant arranged in a similar manner to the immediately preceding example. The purge stream of the $CO_2$ recovery plant includes a significant amount of $CH_4$, for example 20% $CH_4$, and can be separated by an appropriate separation device, such as a standalone membrane. The purge stream of the $CO_2$ recovery plant further includes significant remaining pressure—for example about 250 psig, allowing for the direct return of $CH_4$ recovered by the standalone membrane to a position downstream of the LFG compressor, improving overall $CH_4$ recovery, and saving re-compression energy for that portion of the recycled streams.

The permeate from Stage 2 is returned to a position upstream of the LFG compressor, and the $CO_2$ recovery plant provides a $CO_2$ recovery stream as in the immediately preceding example. In the immediately preceding example, the retentate of the standalone membrane provides the $CH_4$ recovery stream that is recycled to the position downstream of the LFG compressor, and the permeate of the standalone membrane is utilized, at least in part with the permeate from Stage 1, to provide the inert purge gas for recovery operations of the adsorbers of the adsorption stage. In this example, the $CH_4$ recovery stream is returned directly downstream of the LFG compressor (Stream is returned downstream of the LFG compressor and upstream of the adsorber stage), but the $CH_4$ recovery stream may be returned to any one of various places within the RNG processing stream, and/or the return location may be adjusted based on operating conditions or the like. Examples include returning the $CH_4$ recovery stream between the adsorber stage and Stage 1 (e.g., directly upstream of Stage 1), or between the Stages (e.g., downstream of Stage 1, and upstream of Stage 2).

It can be seen that a significant fraction of the $CH_4$ from the permeate of Stage 1 is recovered, the bulk of the overall $CO_2$ in the system is recovered in the $CO_2$ product stream, and compression losses for recovering the $CH_4$ from the permeate of Stage 1 are reduced by retaining and utilizing the high pressure from the retentate of the standalone membrane.

The immediately preceding example system provides for recovery of a majority of the $CO_2$ in the system, and provides a non-condensable stream that is clean, dry, and high pressure, suitable as a regeneration gas for the TSA/PSA system.

This example system provides for recovery of a majority of the $CO_2$ in the system, and enhanced recovery of $CH_4$ in the system provided in the product RNG stream. The high pressure of the non-condensable stream provides for high recovery of remaining $CH_4$, and allows for recycling of the stream at a position upstream of the LFG compressor, reducing energy utilization of the system. Further, the low pressure permeate stream from both a first stage membrane and the standalone membrane are clean and dry, providing a suitable regeneration gas for the TSA/PSA system.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

Example and illustrative embodiments are set forth herein to provide a clear description of aspects of the present disclosure. Methods described herein may be embodied, in whole or part, in systems that perform the steps thereof, and may be distributed across devices in a number of ways, or all of the functionality may be integrated into a dedicated, standalone device, or other hardware. Components of systems set forth herein may be arranged in a number of ways to achieve goals as set forth herein, and/or to achieve other goals that are evident from the disclosure herein. All such permutations and combinations are intended to fall within the scope of the present disclosure.

The invention claimed is:

1. A carbon dioxide recovery system, comprising:
a primary recovery system comprising a plurality of membranes and a swing adsorption component;
a carbon dioxide ($CO_2$) plant assembly fluidly coupled to a permeate of a membrane of the plurality of membranes, the $CO_2$ plant assembly configured to provide a liquid $CO_2$ product stream and a non-condensable stream;
a standalone membrane assembly fluidly coupled to the non-condensable stream, and configured to separate the non-condensable stream into a hydrocarbon enriched stream and a $CO_2$ enriched stream; and
selectively utilizing at least one of the $CO_2$ enriched stream or the permeate of the membrane of the plurality of membranes as a flush gas for the swing adsorption component.

2. The carbon dioxide recovery system of claim 1, wherein the membrane of the plurality of membranes comprises a first sequential membrane.

3. The carbon dioxide recovery system of claim 1, wherein the membrane of the plurality of membranes comprises a second sequential membrane.

4. The carbon dioxide recovery system of claim 1, wherein the $CO_2$ plant assembly is fluidly coupled to the $CO_2$ enriched stream.

5. The carbon dioxide recovery system of claim 1, further comprising an energy recovery system configured to utilize chemical energy of the hydrocarbon enriched stream.

6. The carbon dioxide recovery system of claim 1, further comprising:
wherein the primary recovery system is fluidly coupled to the hydrocarbon enriched stream as a recycle gas.

7. The carbon dioxide recovery system of claim 1, wherein the non-condensable stream is not pressurized between the $CO_2$ plant assembly and the standalone membrane assembly.

8. A carbon dioxide recovery system, comprising:
a primary recovery system comprising a means for separating a source gas into a hydrocarbon product stream and a $CO_2$ enriched recovery stream, and a swing adsorption component;
a means for separating the $CO_2$ enriched recovery stream into a liquid $CO_2$ product stream and a non-condensable stream;
a means for separating the non-condensable stream into a hydrocarbon enriched stream and a $CO_2$ enriched stream; and
a means for providing flush gas to the swing adsorption component.

9. The carbon dioxide recovery system of claim 8, further comprising a means for recycling the $CO_2$ enriched stream.

10. The carbon dioxide recovery system of claim 8, wherein the means for providing flush gas comprises selectively providing the $CO_2$ enriched stream to flush the swing adsorption component.

11. The carbon dioxide recovery system of claim 8, wherein the means for providing flush gas comprises selectively providing a permeate of a first sequential membrane of the primary recovery system to flush the swing adsorption component.

12. The carbon dioxide recovery system of claim 11, wherein the permeate of the first sequential membrane of the primary recovery system comprises the $CO_2$ enriched recovery stream.

13. The carbon dioxide recovery system of claim 11, wherein the permeate of the first sequential membrane of the primary recovery system comprises a recycle stream.

14. The carbon dioxide recovery system of claim 8, wherein the means for providing flush gas comprises selectively providing the non-condensable stream to flush the swing adsorption component.

15. The carbon dioxide recovery system of claim 8, wherein the means for providing flush gas comprises selectively providing the $CO_2$ enriched stream to flush the swing adsorption component.

16. The carbon dioxide recovery system of claim 8, wherein the means for providing flush gas comprises selectively providing a permeate of a second sequential membrane of the primary recovery system to flush the swing adsorption component.

17. The carbon dioxide recovery system of claim 16, wherein the permeate of the second sequential membrane of the primary recovery system comprises the $CO_2$ enriched recovery stream.

18. The carbon dioxide recovery system of claim 16, wherein the permeate of the second sequential membrane of the primary recovery system comprises a recycle stream.

* * * * *